(12) United States Patent
Fazio et al.

(10) Patent No.: US 9,416,577 B2
(45) Date of Patent: Aug. 16, 2016

(54) CARWASH CONVEYOR WITH A SOFT-DROP, ROLLER DOWN CONVEYOR DOOR AND CONVEYOR DOOR

(71) Applicant: SONNY'S ENTERPRISES, INC., Tamarac, FL (US)

(72) Inventors: Paul Fazio, Plantation, FL (US); Anthony Analetto, Weston, FL (US)

(73) Assignee: Sonny's Enterprises, Inc., Tamarac, FL (US)

( * ) Notice: Subject to any disclaimer, the term of this patent is extended or adjusted under 35 U.S.C. 154(b) by 156 days.

(21) Appl. No.: 14/289,861

(22) Filed: May 29, 2014

(65) Prior Publication Data

US 2015/0274428 A1 Oct. 1, 2015

Related U.S. Application Data

(60) Provisional application No. 61/971,886, filed on Mar. 28, 2014.

(51) Int. Cl.
| | | |
|---|---|---|
| *B65G 19/30* | (2006.01) | |
| *E05F 1/10* | (2006.01) | |
| *B60S 3/00* | (2006.01) | |

(52) U.S. Cl.
CPC ............ *E05F 1/1033* (2013.01); *B60S 3/004* (2013.01)

(58) Field of Classification Search
CPC ........ B65G 19/02; B65G 19/30; B65G 47/66; B65G 47/78; B60S 3/004
USPC ......... 198/721, 729, 860.4; 104/172.1, 172.3, 104/102, 105, 162, 164, 165
See application file for complete search history.

(56) References Cited

U.S. PATENT DOCUMENTS

| | | | | |
|---|---|---|---|---|
| 4,266,482 A * | 5/1981 | Barber | ................... | B61B 10/04 104/172.3 |
| 4,374,496 A * | 2/1983 | Hanna | ................... | B65G 19/02 104/172.3 |
| 4,864,936 A * | 9/1989 | Rietsch, Jr. | ............ | B62D 65/18 104/172.1 |
| 6,186,073 B1 * | 2/2001 | Reitsch, Jr. | ............. | B60S 3/004 104/162 |
| 6,671,853 B1 * | 12/2003 | Burkett | ............ | G06F 17/30902 707/E17.12 |
| 7,243,605 B1 * | 7/2007 | Belanger | ................. | B60S 3/004 104/172.1 |
| 8,028,628 B2 * | 10/2011 | Ennis | ...................... | B60S 3/004 104/162 |
| 8,146,511 B1 * | 4/2012 | Analetto | ................. | B60S 3/004 104/165 |
| 8,161,888 B2 * | 4/2012 | Balash | .................... | B60S 3/004 104/165 |
| 2002/0066389 A1 * | 6/2002 | Rietsch, Jr. | ............. | B60S 3/004 104/172.3 |
| 2013/0239992 A1 * | 9/2013 | Detrick | ............... | F15B 15/2876 134/18 |

* cited by examiner

*Primary Examiner* — James R Bidwell
(74) *Attorney, Agent, or Firm* — Laurence A. Greenberg; Werner H. Stemer; Ralph E. Locher

(57) ABSTRACT

A pivoting door is provided for a carwash vehicle conveyor. The pivoting door does not require counter weights or stops. The pivoting door has a top bar, a pair of arms each with a bottom end and extend from the top bar, and tensioning units. One of the tensioning units is disposed at the bottom end of each of the arms. Each of the tensioning units has a main pin and a spring unit. When a roller pushes the top bar to an open position the tensioning units produce a counter torque for automatically returning the pivoting door to a closed position after the roller passes by.

17 Claims, 8 Drawing Sheets

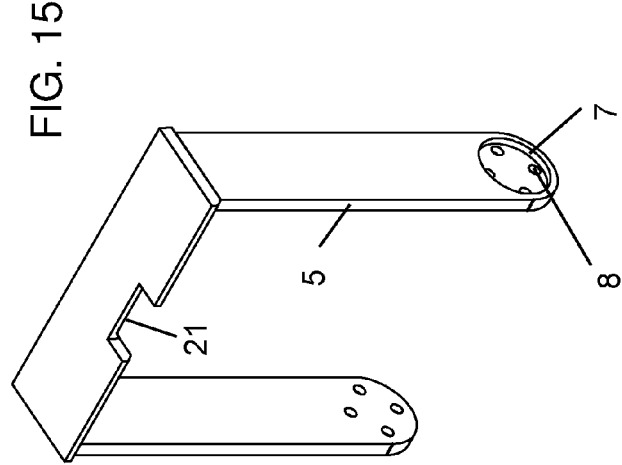
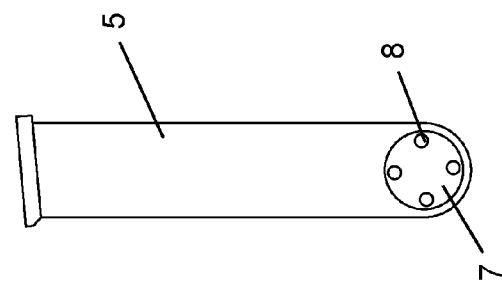
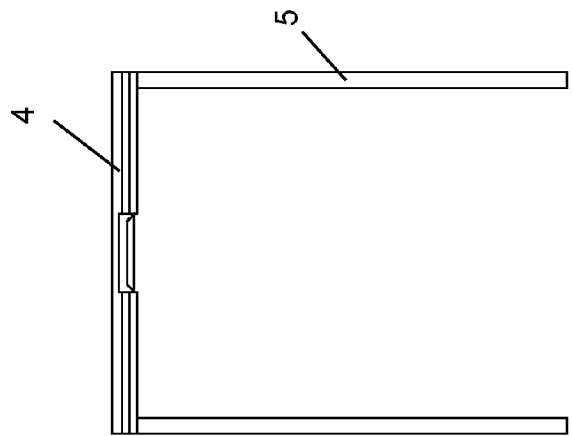

CARWASH CONVEYOR WITH A SOFT-DROP, ROLLER DOWN CONVEYOR DOOR AND CONVEYOR DOOR

CROSS-REFERENCE TO RELATED APPLICATION

This application claims the priority, under 35 U.S.C. §119, of U.S. provisional patent application No. 61/971,886, filed Mar. 28, 2014; the prior application is herewith incorporated by reference in its entirety.

BACKGROUND OF THE INVENTION

Field of the Invention

The invention relates to a pivoting door for an exit end of a carwash conveyor carrying rollers.

Carwash conveyors convey rollers from an entrance end to an exit end of an automated car. As the rollers engage the wheels of a vehicle, the rollers convey the vehicle from the entrance to the exit of the automated carwash. The rollers are attached to an endless, conveyor chain and rotate between the entrance and the exit of the carwash. Once a roller reaches the end of the conveyor, a door is opened that allows the roller to drop down and return to the beginning or entrance end of the conveyor following a lowered, but parallel return path way in the conveyor body.

As the roller reaches the end of the conveyor it pushes open the return door, allowing the roller to drop into the return path leading back to the entrance end. Due to a combination of counter weights and stops, the door is returned to its closed position after the roller passes by. However, the use of counter weights and stops makes the door prone to breakdowns. Therefore there is a desire in the market place for a more robust and less complicated door.

SUMMARY OF THE INVENTION

It is accordingly an object of the invention to provide a carwash conveyor with a soft-drop, roller down conveyor door and a conveyor door that overcome the above-mentioned disadvantages of the prior art devices this general type.

With the foregoing and other objects in view there is provided, in accordance with the invention, a pivoting door for a carwash vehicle conveyor transporting rollers. The pivoting door contains a top bar, a pair of arms each having a bottom end and extend from the top bar, and tensioning units. One of the tensioning units is disposed at the bottom end of each of the arms. Each of the tensioning units has a main pin and a spring unit. When a roller pushes the top bar to an open position the tensioning units produce a counter torque for automatically returning the pivoting door to a closed position after the roller passes by the pivoting door.

In accordance with an added feature of the invention, the spring unit contains a floating insert and spring inserts surrounding the floating insert. The spring inserts provide the counter torque when the pivoting door is rotated.

In accordance with another feature of the invention, the main pin has a shaft and the floating insert houses the shaft. When the pivoting door is rotated to the open position the shaft rotates the floating insert into the spring inserts thus producing the counter torque in the spring inserts for rotating the shaft and thus the pivoting door to the closed position.

In accordance with an additional feature of the invention, a mounting bracket is provide which supports the spring unit.

In accordance with another added feature of the invention, the bottom end of each of the arms has a recess and the main pin has a head part disposed in the recess and affixed to the arm.

In accordance with a further feature of the invention, the spring inserts are rubber inserts.

In accordance with a further additional feature of the invention, a bolt bearing is disposed on the main pin.

In accordance with yet another feature of the invention, the bolt bearing has a bolt mounting plate for mounting to the carwash vehicle conveyor.

In accordance with a concomitant feature of the invention, a cover is attached to an end of the shaft for maintaining the floating insert inside the spring unit.

With the foregoing and other objects in view there is provided, in accordance with the invention, a carwash vehicle conveyor. The carwash vehicle conveyor includes a conveyor body having a roller return end, at least one roller transported over the conveyor body and a pivoting door supported by the conveyor body at the roller return end. The pivoting door contains a top bar, a pair of arms each having a bottom end and extends from the top bar, and tensioning units. One of the tensioning units is disposed at the bottom end of each of the arms. Each of the tensioning units has a main pin and a spring unit. When the roller pushes the top bar to an open position the tensioning units produce a counter torque for automatically returning the pivoting door to a closed position after the roller passes the pivoting door.

Other features which are considered as characteristic for the invention are set forth in the appended claims.

Although the invention is illustrated and described herein as embodied in a carwash conveyor with a soft-drop, roller down conveyor door and a conveyor door, it is nevertheless, not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 13 is a front view of the pivoting door without the tensioning unit;

FIG. 14 is a side view of the pivoting door without the tensioning unit;

FIG. 15 is a perspective view of the pivoting door without the tensioning unit.

DETAILED DESCRIPTION OF THE INVENTION

Figure 1:
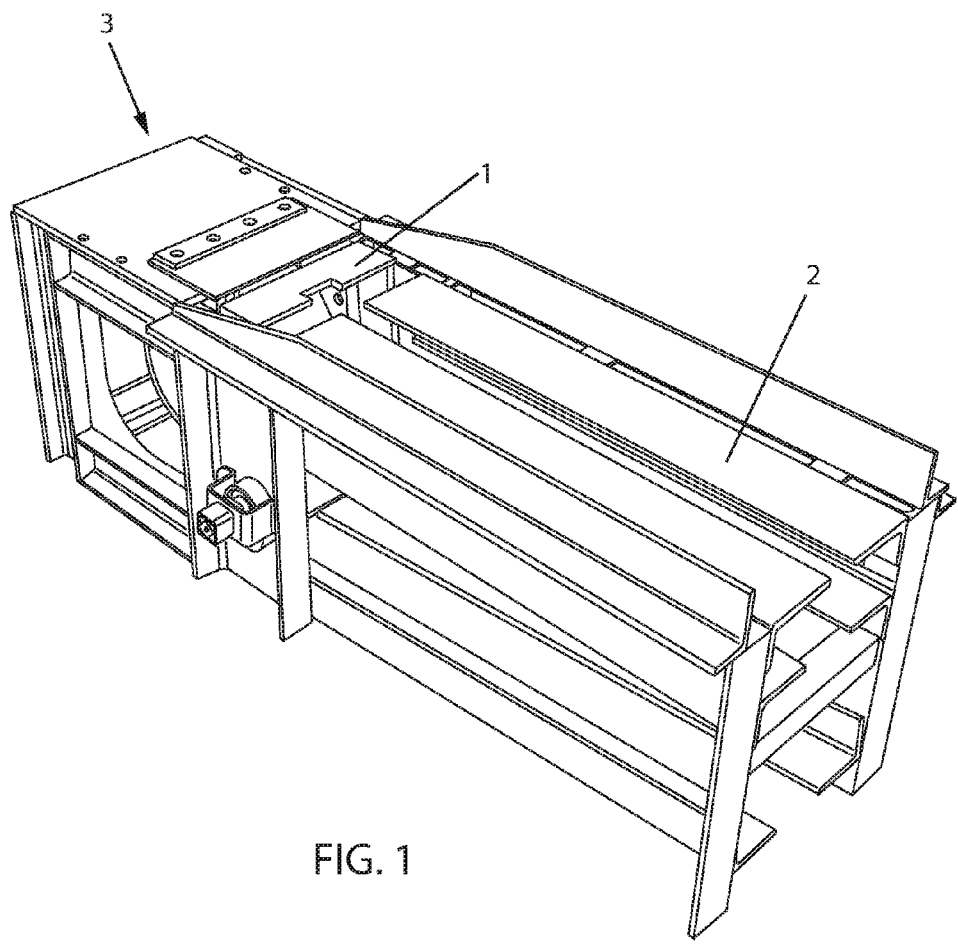
FIG. 1 is a diagrammatic, perspective view of a part of a carwash conveyor having a pivoting door according to the invention.
Figure 16:
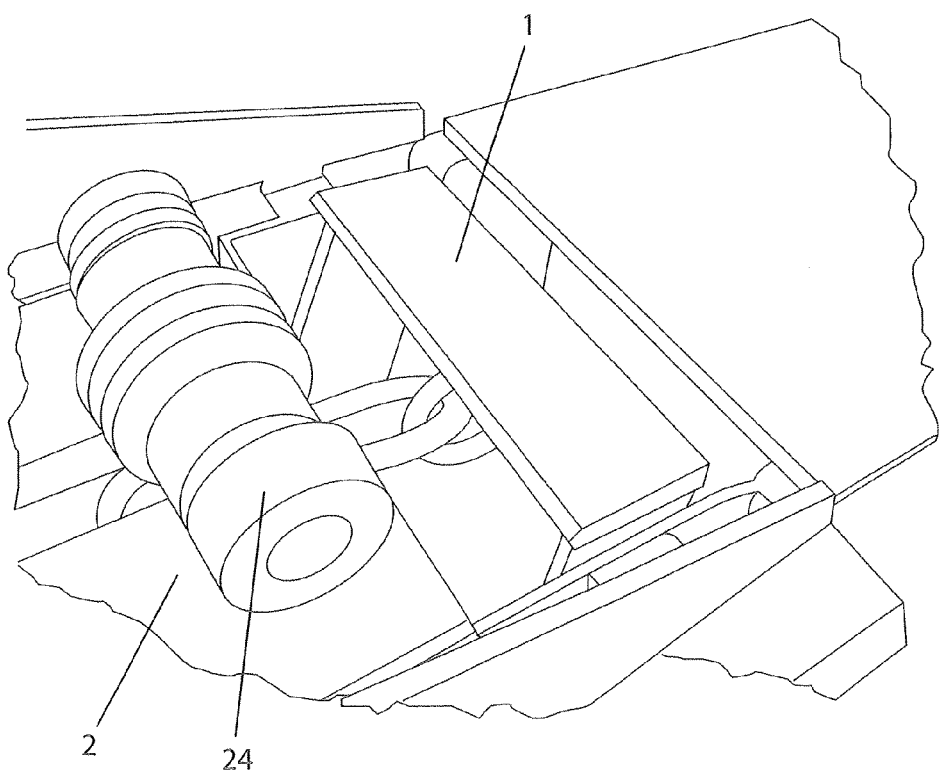
FIG. 16 is a perspective view of the carwash conveyor and an associated roller.

Referring now to the figures of the drawings in detail and first, particularly to FIGS. 1 and 16 thereof, there is shown a pivoting door 1 for use at an exit end of a carwash conveyor 2. It is emphasized at this point that only an end section of the carwash conveyor 2 is shown. The pivoting door 1 allows rollers 24 conveyed along the carwash conveyor 2 to drop down at an exit end 3 of the carwash conveyor 2 and be returned to an entrance end of the carwash conveyor 2 (see FIG. 16). The pivoting door 1 has a special tensioning unit 6 that provides a pivoting motion for the pivoting door 1 and eliminates the need for counter-weights and/or bumper stops thus providing a less complex and more robust carwash conveyor 2 (see FIG. 2).

Figure 2:
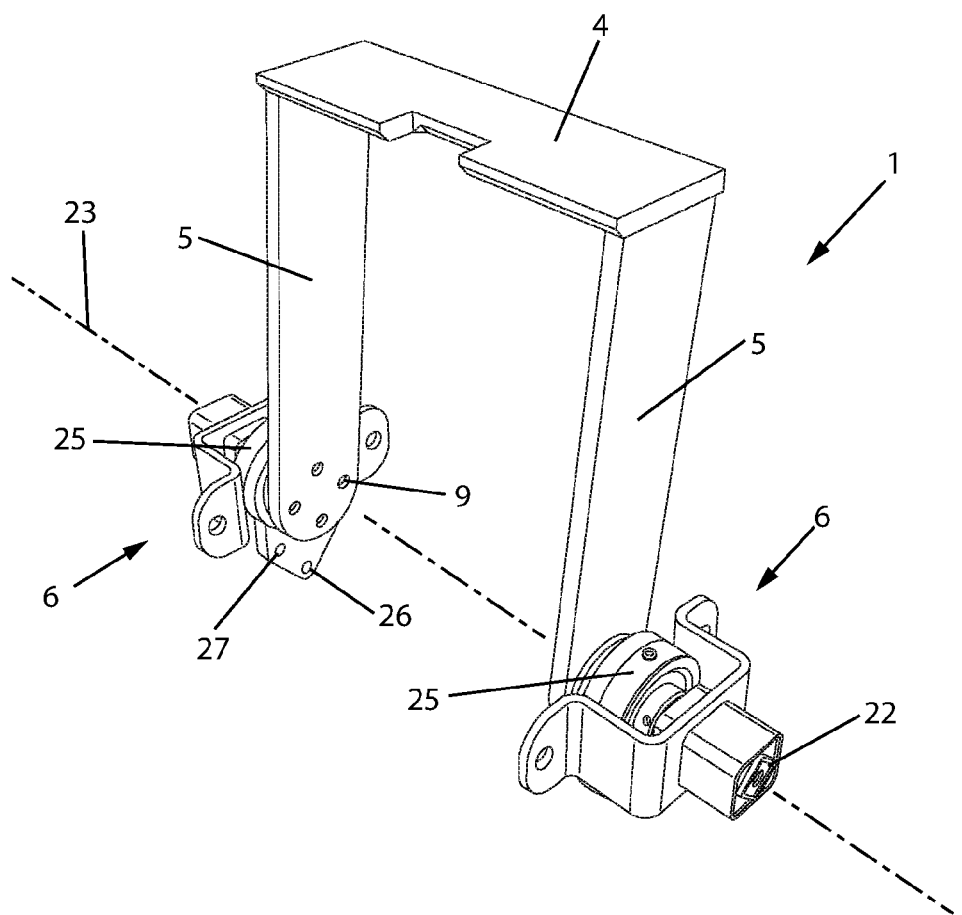
FIG. 2 is a perspective view of the pivoting door.

FIG. 2 shows the pivoting door 1 removed from the carwash conveyor assembly 2. The pivoting door 1 has an entry (top) bar 4 with two arms 5 extending from each side of the entry bar 4. At the bottom of each arm 5 is a tensioning unit 6. The tensioning units 6 are used to provide support and torque limiting properties to the pivoting door 1. In FIG. 4, the pivoting door 1 is shown in a closed position. The pivoting door 1 uses the forward motion of a roller 24 to push the pivoting door 1 open (e.g. push the entry bar 4 backwards out of the way, see FIG. 3). At the same time, the tensioning unit 6 is spring loaded and provides a reaction moment (torque). The reaction torque maintains pressure against the roller 24 and ensures a return of the pivoting door 1 to the closed position as soon as the roller 24 has dropped down.

Figure 3:
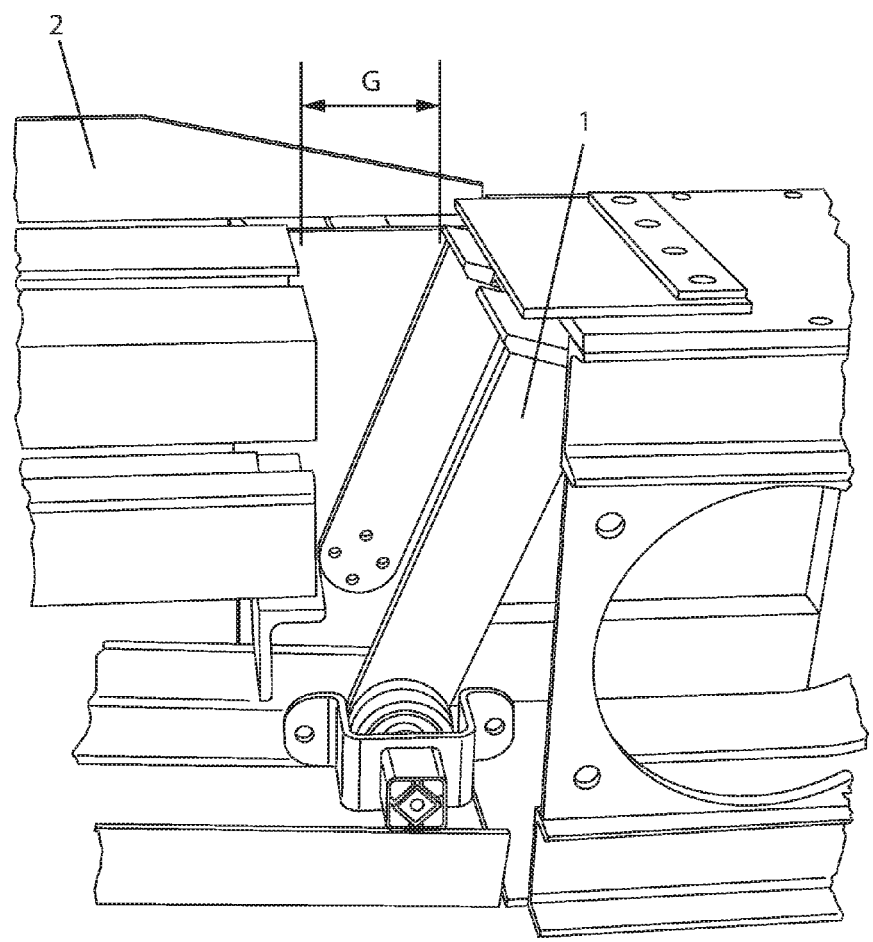
FIG. 3 is a perspective, partially cut-away view of the carwash conveyor with the pivoting door in a closed position.
Figure 4:
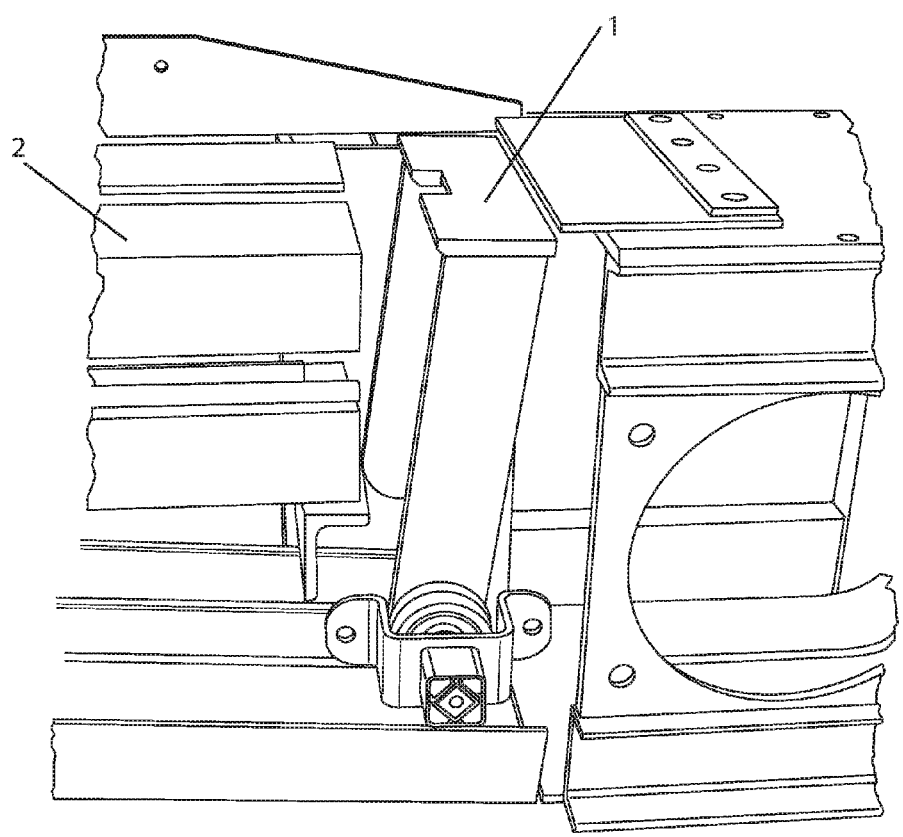
FIG. 4 is a perspective, partially cut-away view of the carwash conveyor with the pivoting door in an open position.
Figure 5:
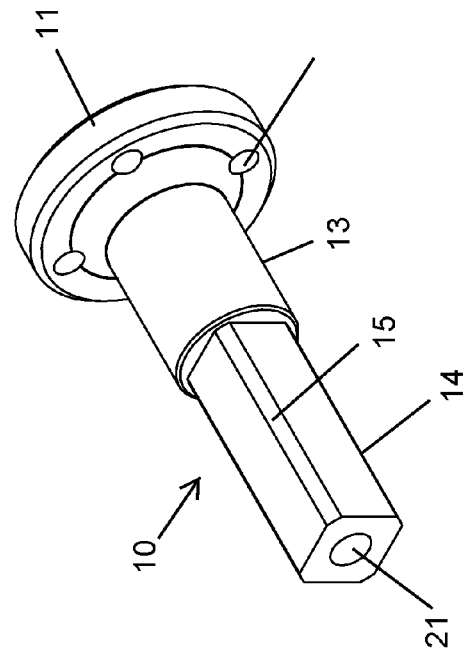
FIG. 5 is a diagrammatic, cross-sectional view of a main pin or spindle of a tensioning unit.

In FIG. 3, the pivoting door 1 is shown in an open position in which a gap G is formed into which the roller 24 falls down into for return to the entrance side of the carwash conveyor 2. FIG. 16 shows the roller 24 right before dropping into an inner body of the carwash conveyor 2.

The tensioning unit 6 functions as a torsional spring which provides radial, axial and cardinal support. When rotated the tensioning unit 6 acts as a spring and a dampener simultaneously. This allows the pivoting door 1 to operate without the need of counter-weights or hard stops as is used in the prior art. In FIG. 2, one tensioning unit 6 is shown on each side of the pivoting door 1 to evenly distribute the load.

As best shown in FIGS. 13-15, each of the arms 5 has a recessed region 7 for receiving a respective tensioning unit 6. The recessed region 7 has four holes 8 formed therein for receiving a fastener 9 (FIG. 2) for attaching the tensioning unit 6 to the arm 5. The entry bar 4 has a recess 21 which engages (receives) a front part of the roller 24. The recess 21 may be optional in dependence on the configuration of the roller 24.

Figure 6:
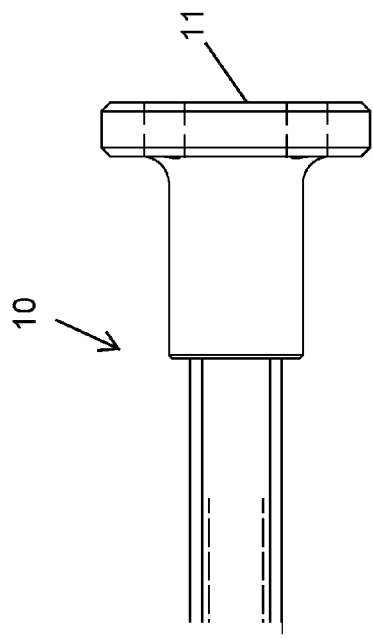
FIG. 6 is a perspective view of the main pin.
Figure 7:
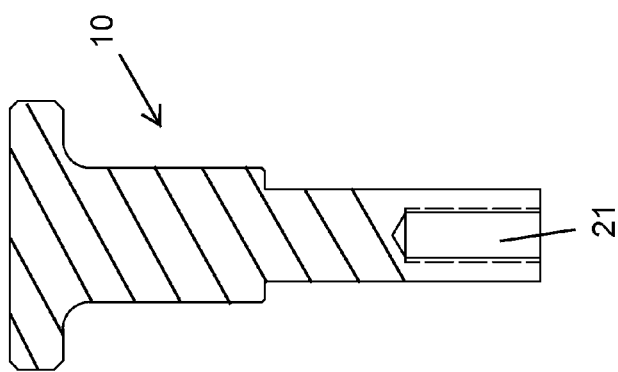
FIG. 7 is a top plan view of the main pin.
Figure 8:
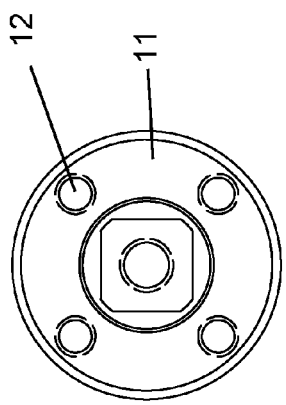
FIG. 8 is a side view of the main pin.
Figure 12:
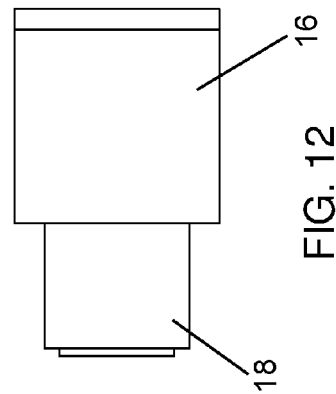
FIG. 12 is a side view of the mounting bracket.
Figure 10:
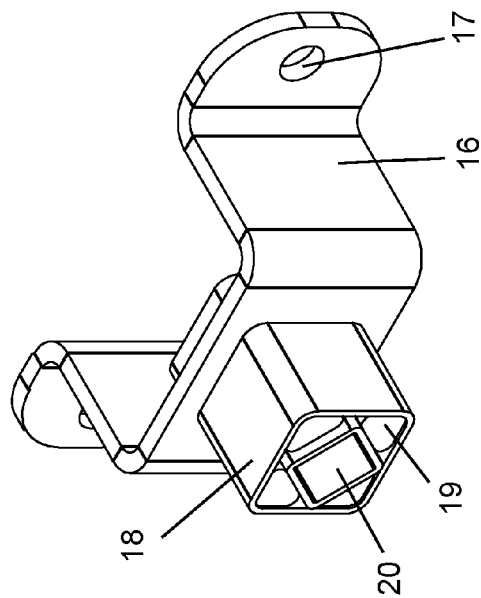
FIG. 10 is a perspective view of the mounting bracket.
Figure 9:
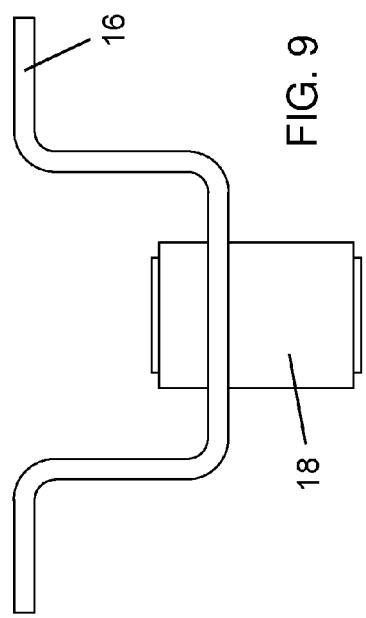
FIG. 9 is a top plan view of a mounting bracket of the tensioning unit.
Figure 11:
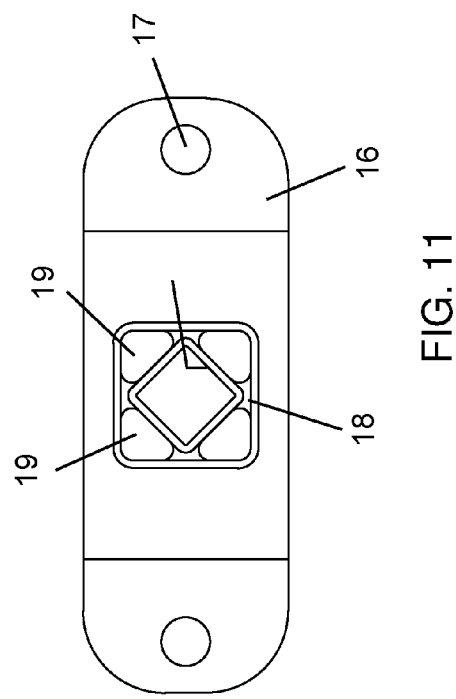
FIG. 11 is a front view of the mounting bracket.

As shown in FIGS. 5-8, the tensioning unit 6 has a main pin or spindle 10. The main pin 10 has a circular pin head 11 with four holes 12 and engages into the recessed region 7 of the arm 5. Extending from the pin head 11 is a bearing support region 13 (FIG. 6). Extending from the bearing support region 13 is a spring shaft end 14. The spring shaft end 14 has a rectangular (square) cross-section with rounded or tapered sides 15. At the end of the spring shaft end 14 is a recess 21.

FIGS. 9-12 show a mounting plate 16 of the tensioning unit 6. The mounting plate 16 has two holes 17 for receiving a fastener to fix the mounting plate 16 to a side of the carwash conveyor 2. The mounting plate 16 houses or supports a spring unit 18. The spring unit 18 has or houses four rubber inserts 19 which surround a rectangular shaped, floating insert 20 having a cross section matching that of the spring shaft end 14. An end cover 22 (see FIG. 2) is fastened via a fastener engaging into the recess 21 of the main pin 10.

As the arms 5 are rotated about an axis of rotation 23 (FIG. 2), the main pin 10 rotates, and thus the spring shaft end 14 rotates, causing the floating insert 20 to rotating against the rubber inserts 19. As the floating insert 20 presses against the rubber inserts 19 a counter torque is produced by the rubber inserts 19 against the directional turning of the floating insert 20. Once the roller 24 has dropped through the gap G, the counter torque rotates the pivoting door 1 back into the closed position. It is noted at this point that the force of the moving roller 24 is much greater than the counter torque, but the counter torque is greater than the weight of the pivoting door 1, and once the roller 24 drops into the interior of the conveyor 2, the pivoting door 1 is automatically swung to the closed position once again. When rotating, the tensioning unit 6 acts as a spring and a dampener simultaneously.

As shown in FIG. 2, a bolt bearing 25 is supported by the bearing support region 13 of the main pin 10. The bolt bearing 25 has a bearing mounting plate 26 which also has openings 27 for fastening the bolt bearing 25 to the side of the carwash conveyor 2. The bolt bearing 25 provides extra radial support and assists in protecting the tensioning unit 6 from the crushing weight of vehicles being conveyed by the carwash conveyor 2. The tensioning units 6 are used in combination with the bolt bearings 25 to provide support and a torque limiting function to the pivoting door 1.

The pivoting door 1 is configured to rotate up to 30 degrees and the torque provided is linearly proportional to its rotation.

Due to the spring loaded configuration of the pivoting door 1, no counter weights or stops are needed. Therefore the pivoting door of the invention is less complex and more robust than doors used in the prior art.

The invention claimed is:

1. A pivoting door for a carwash vehicle conveyor transporting rollers, the pivoting door comprising:
    a top bar;
    a pair of arms each having a bottom end and extending from said top bar; and
    tensioning units, one of said tensioning units disposed at said bottom end of each of said arms, each of said tensioning units having a main pin and a spring unit, and when a roller pushes said top bar to an open position said tensioning units produce a counter torque for automatically returning the pivoting door to a closed position after the roller passes by the pivoting door.

2. The pivoting door according to claim 1, wherein said spring unit contains a floating insert and spring inserts surrounding said floating insert, said spring inserts providing the counter torque when the pivoting door is rotated.

3. The pivoting door according to claim 2, wherein:
    said main pin has a shaft; and
    said floating insert houses said shaft, and when the pivoting door is rotated to the open position said shaft rotates said floating insert into said spring inserts thus producing the counter torque in said spring inserts for rotating said shaft and thus the pivoting door back to the closed position.

4. The pivoting door according to claim 3, further comprising a mounting bracket supporting said spring unit.

5. The pivoting door according to claim 1, wherein:
    said bottom end of each of said arms has a recess formed therein; and said main pin has a head part disposed in said recess and affixed to said arm.

6. The pivoting door according to claim 2, wherein said spring inserts are rubber inserts.

7. The pivoting door according to claim 1, further comprising a bolt bearing disposed on said main pin.

8. The pivoting door according to claim 7, wherein said bolt bearing has a bolt mounting plate for mounting to the carwash vehicle conveyor.

9. The pivoting door according to claim 3, further comprising a cover attached to an end of said shaft for maintaining said floating insert inside said spring unit.

10. A carwash vehicle conveyor, comprising:
a conveyor body having a roller return end;
at least one roller transported over said conveyor body; and
a pivoting door supported by said conveyor body at said roller return end, said pivoting door containing:
a top bar;
a pair of arms each having a bottom end and extending from said top bar; and
tensioning units, one of said tensioning units disposed at said bottom end of each of said arms, each of said tensioning units having a main pin and a spring unit, and when said roller pushes said top bar to an open position said tensioning units produce a counter torque for automatically returning said pivoting door to a closed position after said roller passes said pivoting door.

11. The carwash vehicle conveyor according to claim 10, wherein said spring unit contains a floating insert and spring inserts surrounding said floating insert, said spring inserts providing the counter torque when said pivoting door is rotated.

12. The carwash vehicle conveyor according to claim 11, wherein:
said main pin has a shaft; and
said floating insert houses said shaft, and when said pivoting door is rotated to the open position said shaft rotates said floating insert into said spring inserts thus producing the counter torque in said spring inserts for rotating said shaft and thus said pivoting door to the closed position.

13. The carwash vehicle conveyor according to claim 12, further comprising a mounting bracket supporting said spring unit, said mounting bracket affixed to said conveyor body.

14. The pivoting door according to claim 10, wherein:
said bottom end of each of said arms has a recess formed therein; and
said main pin has a head part disposed in said recess and affixed to said arm.

15. The carwash vehicle conveyor according to claim 11, wherein said spring inserts are rubber inserts.

16. The carwash vehicle conveyor according to claim 10, further comprising a bolt bearing disposed on said main pin.

17. The carwash vehicle conveyor according to claim 16, wherein said bolt bearing has a bolt mounting plate mounted to said conveyor body.

\* \* \* \* \*